United States Patent [19]

Long

[11] Patent Number: 5,433,470
[45] Date of Patent: Jul. 18, 1995

[54] METHOD AND APPARATUS FOR ABSORBING RESONANCE VIBRATION IN A LEAF SPRING IN A SUSPENSION SYSTEM

[75] Inventor: William R. Long, Yorba Linda, Calif.

[73] Assignee: Monroe Auto Equipment Company, Monroe, Mich.

[21] Appl. No.: 72,918

[22] Filed: Jun. 7, 1993

[51] Int. Cl.⁶ .............................................. B60G 11/04
[52] U.S. Cl. .................................. 280/718; 267/227; 267/260
[58] Field of Search ............... 280/718, 720, 712, 710; 267/259, 36.1, 140, 260, 52, 229, 271, 227, 31

[56] References Cited

U.S. PATENT DOCUMENTS

| | | |
|---|---|---|
| 3,771,626 | 11/1973 | Palmer . |
| 3,930,547 | 1/1976 | West . |
| 4,598,930 | 7/1986 | Smith ..................... 280/712 |
| 4,678,204 | 7/1987 | Hetherington ....................... 280/718 |
| 5,188,195 | 2/1993 | Haustein ............................... 280/720 |

FOREIGN PATENT DOCUMENTS 558966  6/1923  France .
606324  7/1932  Germany .

OTHER PUBLICATIONS

Two Pages; (a) Phase II of a Chrysler Minivan with Automatic Rear Air Leveling, and (b) an enlarged view of a Leaf Spring Application.

*Primary Examiner*—Karin L. Tyson
*Attorney, Agent, or Firm*—Harness, Dickey & Pierce

[57] ABSTRACT

A suspension system for an automotive vehicle having a sprung portion and an unsprung portions. The suspension system includes a leaf spring for insulating the transmission of road vibration from the unsprung portion of the automotive vehicle to the sprung portion of the automotive vehicle, the open span of the leaf spring being susceptible to resonance vibration. The suspension system further includes a resonance vibration damper which is able to attenuate resonance vibration of the leaf spring.

15 Claims, 3 Drawing Sheets

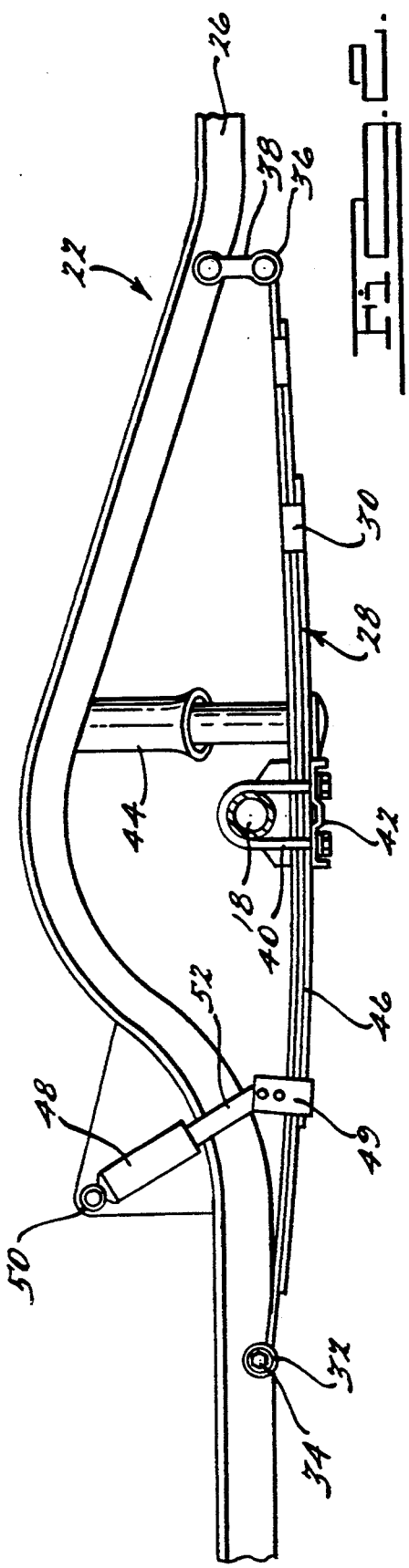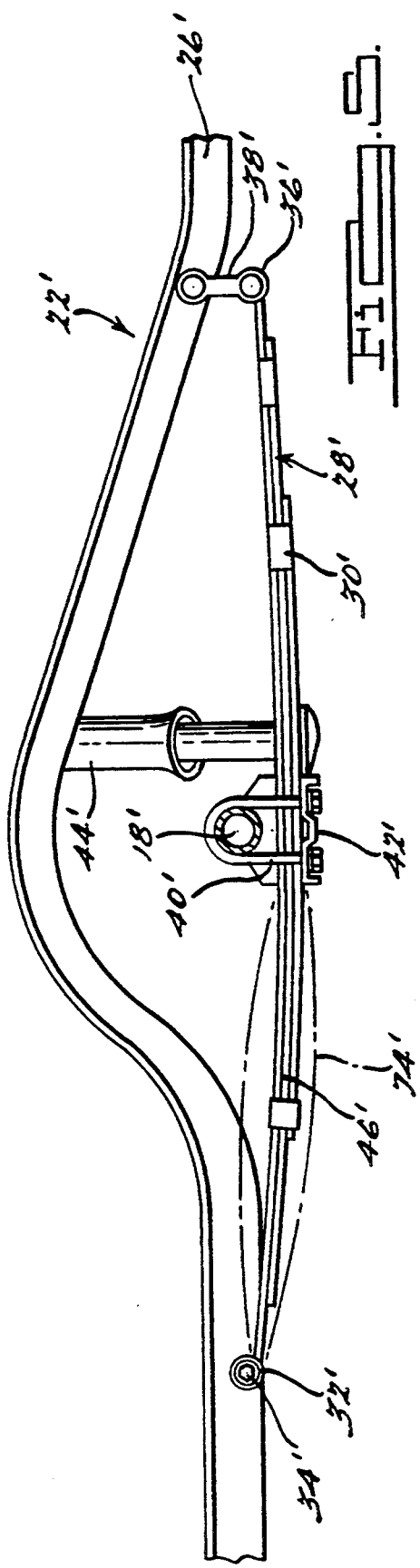

METHOD AND APPARATUS FOR ABSORBING RESONANCE VIBRATION IN A LEAF SPRING IN A SUSPENSION SYSTEM

BACKGROUND OF THE INVENTION

1. Field of the Invention

This invention relates to suspension systems for automobiles and machines which receive mechanical shock, and more particularly, to a method and apparatus for absorbing resonance vibration in a leaf spring of a suspension system.

2. Description of the Related Art

Suspension systems are used to smooth or dampen road vibration which occurs when automotive vehicles are driven. In this regard, suspension systems serve to isolate the sprung portion of the automotive vehicle from the unsprung portion of the automotive vehicle. The term "sprung portion" is used to identify the body and frame of the automotive vehicle which is vibrationally insulated from road vibration, while the term "unsprung portion" is used to identify that portion of an automotive vehicle which is not vibrationally insulated from road vibration. The unsprung portion of the automotive vehicle may typically include the axle, wheels, and drive shaft of the automotive vehicle.

A typical suspension system includes a leaf spring which is attached at each end to the frame of the automotive vehicle. In addition, the center portion of the leaf spring is attached to the drive axle of the automotive vehicle. As the drive axle of the automotive vehicle moves due to road undulations, the leaf spring tends to insulate the axle movement so as to smooth the ride which is felt by the passengers of the automotive vehicle. As those skilled in the art will appreciate, the longer the leaf spring is, the greater the degree to which the leaf spring is able to insulate road vibration and therefore improve ride comfort.

While it is desirable to increase the length of leave springs so as to improve ride comfort, a disadvantage occurs as the length of the leaf spring increases. This is because resonance vibrations can be formed in the open span of the leaf spring (i.e., the unsupported length of the leaf spring) which can become substantial as the length of the open span increases. As a result, wheel hop may occur which degradates not only ride comfort but road holding ability. Accordingly, a need exists for a means to attenuate resonance vibrations in a leaf spring so as to allow longer leaf springs to be used in suspension systems.

SUMMARY OF THE INVENTION

Accordingly, it is the primary object of the present invention to provide a method and apparatus for absorbing resonance vibrations in the open span of the leaf springs of a suspension system.

Another object of the present invention is to provide a method and apparatus for absorbing resonance vibrations in the open span of the leaf springs of a suspension system thereby permitting the length of the leaf spring to be relatively large.

A related object of the present invention is to provide a method and apparatus for attenuating resonance vibrations in the open span of the leaf springs of a suspension system which is able to reduce the possibility that wheel hop may occur.

A further object of the present invention is to provide a method and apparatus for attenuating resonance vibrations in the open span of the leaf springs of a suspension system which is relatively simple and relatively low in cost.

BRIEF DESCRIPTION OF THE DRAWINGS

Other objects of the present invention will become apparent to one skilled in the art upon reading the following specification and by reference to the following drawings in which:

FIG. 2 is an elevational view of the suspension system shown in FIG. 1 according to the preferred embodiment of the present invention;

FIG. 5 is an elevational view of a suspension system similar to that shown in FIG. 2 which does not include a resonance vibration damper and illustrates the resonance vibration of a leaf spring in a suspension system.

DESCRIPTION OF THE PREFERRED EMBODIMENT

Figure 1:
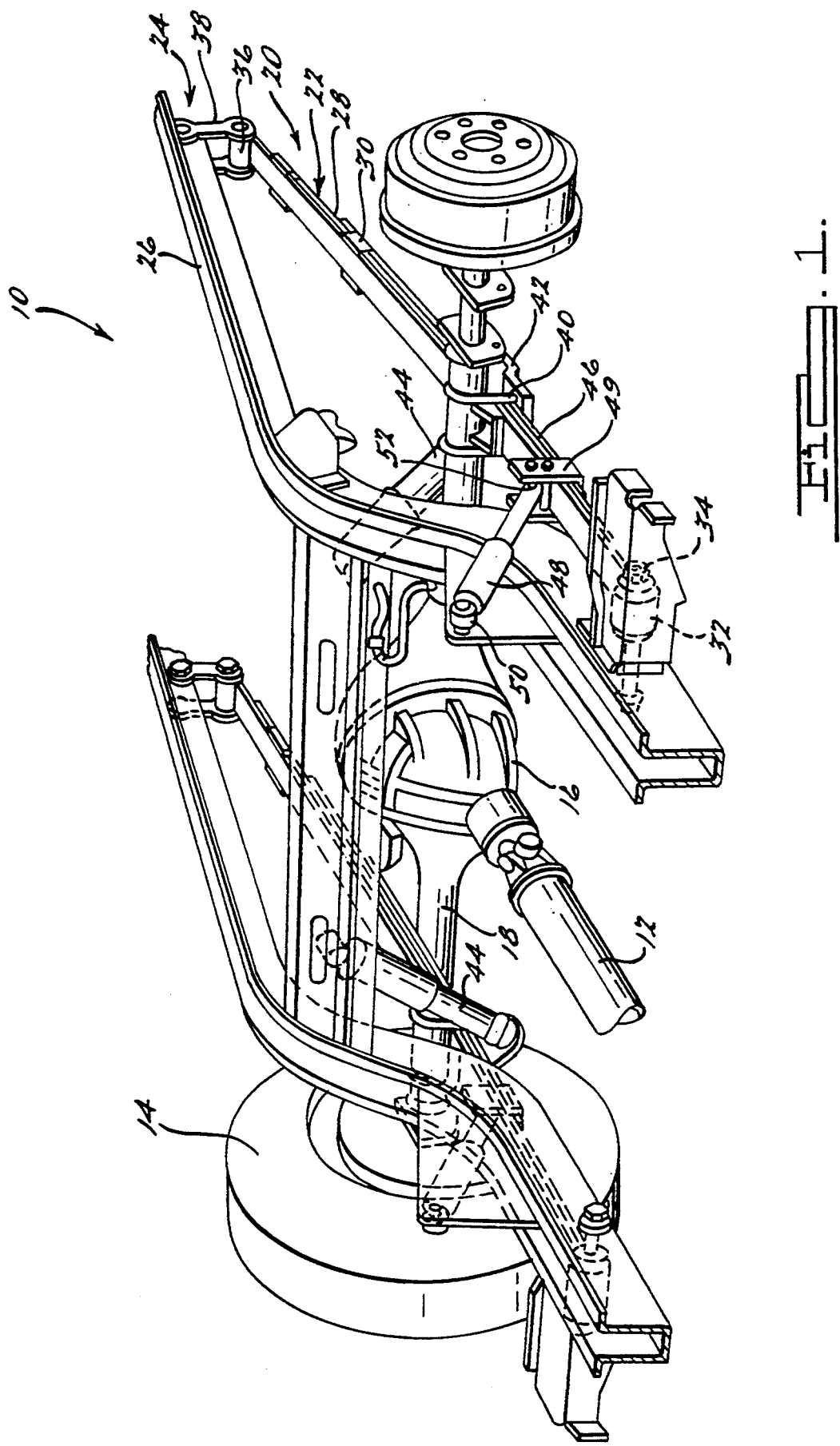
FIG. 1 is a perspective view of a suspension system using the method and apparatus for absorbing resonance vibrations in the open span of a leaf spring according to the preferred embodiment of the present invention.

Referring to FIG. 1, the rear chassis of an automotive vehicle 10 is shown. The automotive vehicle 10 includes a drive shaft 12 which is connected to an engine (not shown) which is operable to generate torque for use in driving the wheels 14 of the automotive vehicle 10. The drive shaft 12 is able to deliver the torque from the engine to the wheels by means of differential unit 16 and a plurality of rear drive axles 18. The wheels 14, the drive axles 18, as well as the portion of the drive shaft 12 which is supported by the differential unit 16 will be collectively referred to as the "unsprung portion" of the automotive vehicle 10 which is generally designated by the numeral 20. In this regard, road vibrations are delivered to the unsprung portion 20 of the automotive vehicle 10 directly without being damped. The automotive vehicle 10 may be a passenger car, a sport utility vehicle, a truck or any other type of automotive vehicle having a suspension system of the type described below.

The automotive vehicle 10 further comprises a suspension system which is generally designated by the numeral 22. The suspension system 22 is operable to insulate the transmission of road vibration from the unsprung portion 20 of the automotive vehicle 10 to the sprung portion of the automotive vehicle 10. The sprung portion of the automotive vehicle 10, which is generally designated by the numeral 24, includes the frame 26 of the automotive vehicle 10, upon which the body (not shown) of the automotive vehicle 10 is secured, as well as those elements which receive support from the frame 26 (such as a portion of the drive shaft 12). It will be appreciated that the vibration which is insulated by the suspension system 22 is that which is transmitted to the unsprung portion 20 of the automotive vehicle 10 at the tire-to-road interface which is generally referred to as road vibration. While the suspension system 22 is shown as being associated with the rear axle system of the automotive vehicle 10, the suspension system 22 may also be incorporated into the front axle system.

To provide means for insulating the transmission of road vibration from the unsprung portion 20 of the automotive vehicle 10 to the sprung portion 24 of the automotive vehicle 10, the suspension system 22 further includes a plurality of leaf springs 28. The leaf springs 28 are able to insulate the transmission of road vibration between the drive axle 18 and the frame 26 of the automotive vehicle 10 by the flexing of the leaf springs 28. Each of the leaf springs 28 include a plurality of leaf spring clamps 30 which are operable to provide for the alignment of the individual spring leaves which form the leaf springs 28.

Each of the leaf springs 28 include a first end portion 32 which is mechanically attached by means of a spring hanger mounting bolt 34 to the frame 26 of the automotive vehicle 10 at a position generally in front of the drive axle 18. In addition, each of the leaf springs 28 includes a second end portion 36 which is connected to the frame 26 of the automotive vehicle 10 at a position which is generally behind the drive axle 18 of the automotive vehicle 10. The second end portion 36 of the leaf spring 28 is connected to the frame 26 of the automotive vehicle 10 by means of a shackle assembly 38. Finally, the center portion of each of the leaf springs 28 is connected to the drive axle 18 of the automotive vehicle 10 by means of a plurality of U-bolts 40 which are connected to a spring plate 42.

To provide for the progressive damping of movement of the drive axle 18 with respect to the frame 26 of the automotive vehicle 10, the suspension system 22 further includes a first plurality of dampers 44. One end of each of the dampers 44 is connected to the frame 26, while the other end of each of the dampers 44 mechanically communicates with the spring plate 42 which is associated with each of the leaf springs 28. As movement of the drive axle 18 occurs due to road undulations, the dampers 44 provide resistance to such movement so as to improve ride comfort as well as road holding ability. The dampers may typically be a hydraulic actuator of the type which is available from Monroe Auto Equipment Co. as Model No. SK-967. However, other suitable dampers may be used.

As those skilled in the art will appreciate, it is desirable to have the leaf springs 28 be relatively long so as to provide a relatively smooth ride. This is because the longer the leaf springs 28 are, the greater the amount of the deflection permitted by the leaf springs 28 for a given force applied to the wheels 14. However, it will also be appreciated that as the length of the leaf springs 28 increase, the greater the likelihood that the open span 46 of the leaf springs 28 (i.e., the length of the leaf spring 28 between U-bolt 40 where the leaf spring 28 is connected to the drive axle 18 and the mounting bolt 36 where the leaf spring 28 is connected to the frame 26) will be susceptible to resonance vibration. That is, as the length of the leaf springs 28 increases, the vibration of the leaf springs 28 which is due to the physical characteristics of the leaf springs 28 (and not primarily caused by the interface between the wheels 14 and the road) increases. This vibration mode is not damped out by dampers 44 which are effectively at a node for the vibration mode of concern (i.e., open span resonance). In severe cases, the resonance vibration of the leaf springs 28 may result in wheel hop. As used herein, the term "resonance vibration" will include both resonance, resonance harmonics and/or sympathic vibrations in the open span 46 of the leaf springs 28.

To overcome these disadvantages, the present invention provides a suspension system for an automotive vehicle which has a sprung portion and an unsprung portion. The suspension system includes means for insulating the transmission of road vibration from the unsprung portion of automotive vehicle to the sprung portion of the automotive vehicle such as a leaf spring. In addition, the present invention includes means for attenuating the resonance vibration which may be induced in that means for insulating the transmission of road vibration. By attenuating the resonance vibration in the leaf spring 28, the possibility that undesirable characteristics, such as wheel hop, will occur is reduced.

The present invention will now be more fully described with respect to FIG. 2. In this regard, to provide means for attenuating the resonance vibration induced in the leaf spring 28, the suspension system 22 further includes a resonance vibration damper 48 having a first end portion 50 and a second end portion 52. The first end portion 50 of the resonance vibration damper 48 mechanically communicates with the frame 26 of the automotive vehicle 10, while the second end portion 52 of the resonance vibration damper 48 mechanically communicates with the leaf spring 28. In this regard, the second end portion 52 of the resonance vibration damper 48 mechanically communicates with a leaf spring damper clamp 49, which will be more fully described below, which is located on the open span 46 of the leaf spring 28.

As will be appreciated by those skilled in the art, the resonance vibration damper 48 attenuates the resonance vibration of the open span 46 of the leaf spring 28. Preferably, the resonance vibration damper 48 provides relatively soft damping forces during compression of the resonance vibration damper 48 while providing relatively firm damping forces during rebound of the resonance vibration damper 48. This selection of the damping forces for the resonance vibration damper 48 does not substantially interfere with the ride characteristics generated by the leaf spring 28 while still allowing the resonance vibration damper 48 to attenuate the resonance vibration induced in the open span 46 of the leaf spring 28. The resonance vibration damper 48 may be of any suitable form. However, it is preferred that the resonance vibration damper 48 be a hydraulic damper which generates damping forces by the flow of damping fluid through a piston disposed within the working chamber. One such damper is available from Monroe Auto Equipment Co. as Model No. SK-967, though other suitable dampers may be used.

Figure 3:
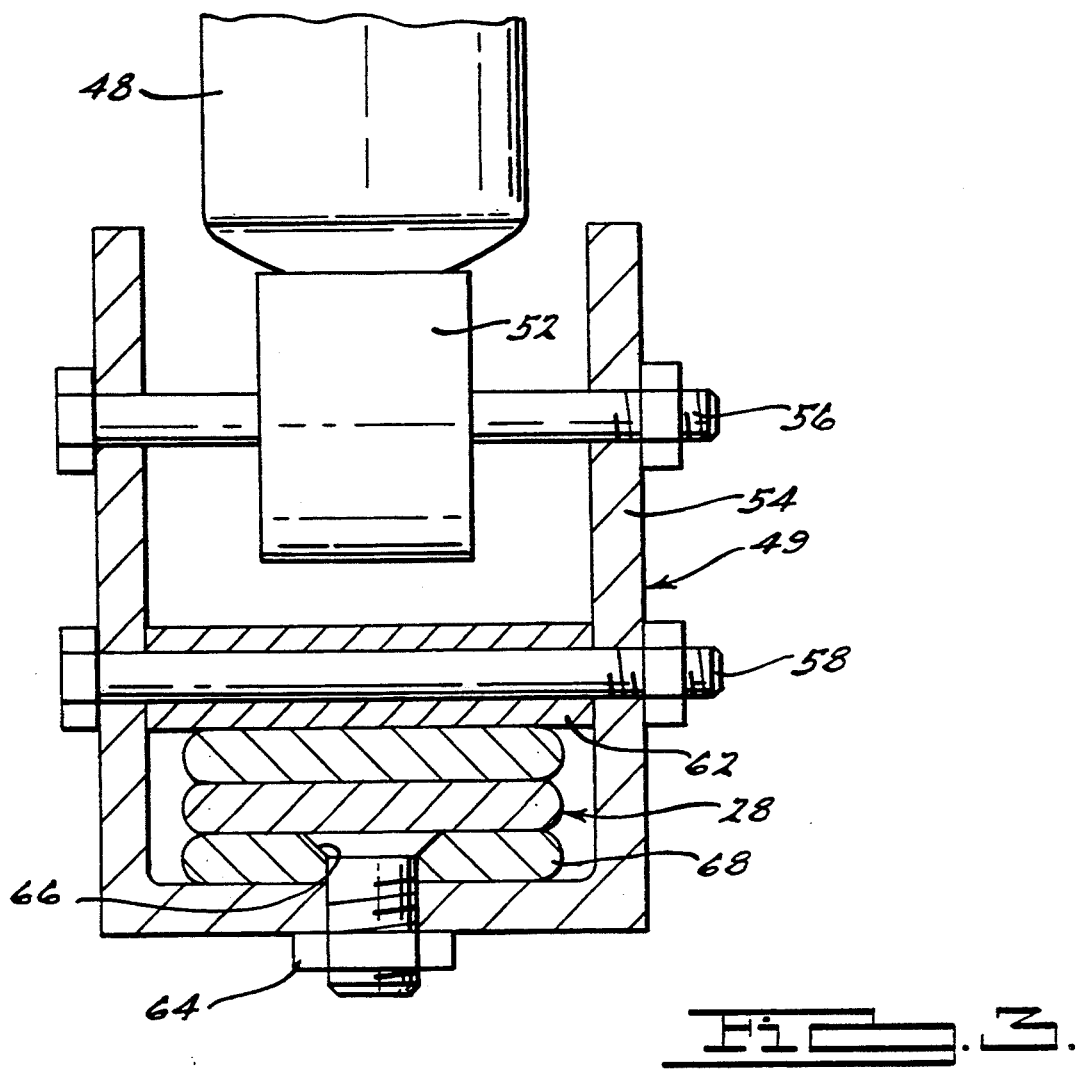
FIG. 3 is a cross-sectional view of a leaf spring damper clamp shown in FIG. 2 according to the preferred embodiment of the present invention.

The structure of the leaf spring damper clamp 49 will now be described with reference to FIG. 3. The leaf spring damper clamp 49 includes a U-shaped body 54 having a first fastener 56 and a second fastener 58. The first fastener 56 is operable to be inserted through the second end portion 52 of the resonance vibration damper 48 so as to secure the vibration resonance damper 48 to the U-shaped body 54. The second fastener 58 is disposed below the first fastener 56 and serves to traditionally capture the leaves 60 of the leaf spring 28 between the second fastener 58 and the bottom portion of the U-shaped body 54. Disposed on the second fastener 58 is a sleeve or a block 62 which is used to carry compressive load from the vibration resonance damper 48 into the leaf spring 28. To secure the leaf spring 28 to the U-shaped body 54, the leaf spring damper clamp 49 further includes a third fastener 64. The third fastener 64 extends through the bottom portion of the U-shaped body 54 and extends into an aperture 66 in the lower leaf 68 of the leaf spring 28. Importantly, the third fastener 64 operates to immovably secure the U-shaped body 54 to the leaf spring 28 in such a manner that the leaf spring damper clamp 49 is inhibited from any movement longitudinally along the open span 46. Accordingly, vibration forces transmitted to the damper clamp 49 via the interconnection between the end portion 52 of the damper 48 and the U-shaped body 54 do not force the body 54 from its predetermined location relative to the leaf spring 28.

Figure 4:
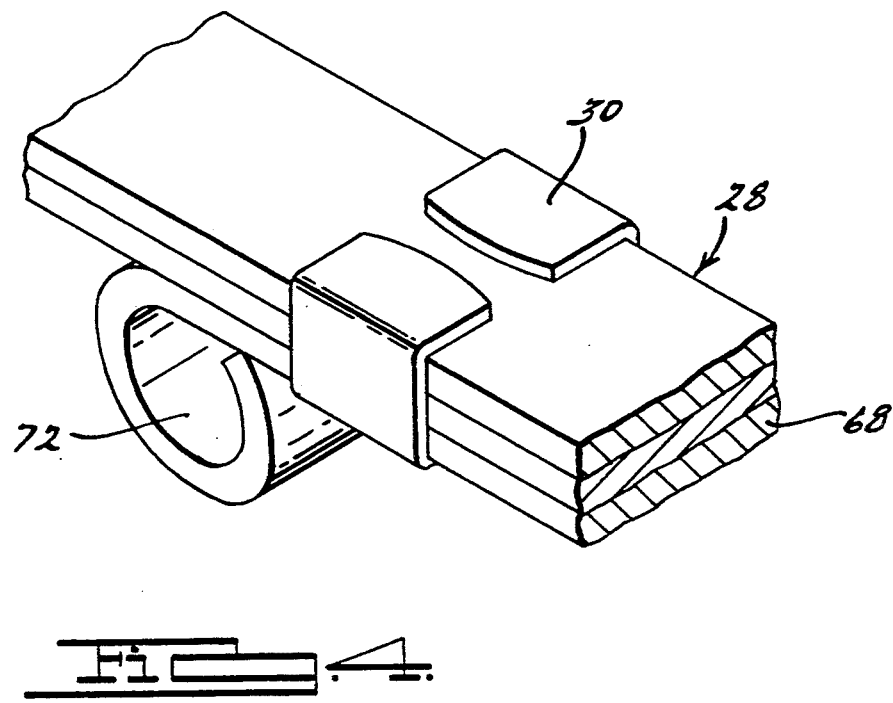
FIG. 4 is a prospective view of the leaf spring showing an alternative method for attaching the resonance vibration damper according to the preferred embodiment of the present invention.

It will be appreciated that other methods may be used to secure the resonance vibration damper 48 to the leaf spring 28. For example, the resonance vibration damper 48 may be attached to the lower leaf 68 of the leaf spring 28 in the manner shown in FIG. 4. In this regard, the leaf spring 28 is longitudinally extending and includes a spring clamp 30 for clamping a stack of flat leaves together with the lower leaf 68 of the stack having an end portion 72 extending longitudinally from the clamp. The end portion 72 is formed into a cylindrically shaped eye which is sized to receive a fastener (not shown) that secures the resonance vibration damper 48 to the cylindrical shaped end portion 72.

The advantageous features of the present invention can be seen by comparing the operation of the suspension system 22' shown in FIG. 5 which does not have a resonance vibration damper 48 with the suspension system 22 shown in FIG. 2 which includes the resonance vibration damper 48. Because the suspension system 22' shown in FIG. 5 does not have a resonance vibration damper attached to the open span 46' of the leaf spring 28', the leaf spring 28' shown in FIG. 5 is susceptible to unwanted resonance vibration. The position of the leaf spring 28' during the maximum amplitude of such resonance vibration is generally illustrated in FIG. 5 by the phantom line 74'. This resonance vibration of the open span 46' of the leaf spring 28' may cause wheel hop to occur. However, the presence of the resonance vibration damper 48 in the suspension system 22 shown in FIG. 2 attenuates this resonance vibration of the leaf spring 28 thereby reducing the possibility that wheel hop will occur.

The method associated with the present invention will now be described. The leaf spring 28 is first secured between the sprung portion 24 of the automotive vehicle 10 and the unsprung portion 20 of the automotive vehicle 10. This is performed by securing the first end portion 32 of the leaf spring 28 to the frame 26 of the automotive vehicle 10 by the spring hanger mounting bolt 34 as well as securing the second end portion 36 of the leaf spring 28 to the frame 26 of the automotive vehicle 10 by means of the shackle assembly 38. A resonance vibration damper 48 is disposed between the leaf spring 28 and the frame 26 of the automotive vehicle 10. As the leaf spring 28 begins to vibrate in resonance, the energy which generates the resonance vibration is dissipated by the extension and compression of a resonance vibration damper 48. In this regard, the resonance vibration damper 48 is able to generate relatively soft damping forces during compression and relatively firm damping forces during extension so as to allow the leaf spring 28 to optimally insulate road vibration while minimizing the opportunity for resonance vibration to occur.

It will be appreciated that the present invention is susceptible to modification, variation and change without departing from the scope of the invention. For example, the resonance vibration damper may be of any suitable type which is able to damp resonance vibration of the leaf spring. The invention may also be applied, when appropriate, to either the anchor end open span (shown) or the shackle end open span of the leaf spring. In addition, the suspension system may be associated with any particular type of automotive vehicle or with any other type of application where such resonance vibration may be present. Furthermore, the present invention may be used with other types of suspension systems which do not have leaf spring per se but where resonance vibration of a similar element may occur. Other variations of the present invention will become apparent upon review of the following claims.

What is claimed is:

1. A suspension system for an automotive vehicle having sprung and unsprung portions, said suspension system comprising:

a leaf spring for insulating the transmission of road vibration from said unsprung portion of said automotive vehicle to said sprung portion of said automotive vehicle, said leaf spring including a plurality of leaves, at least one of which includes a cylindrically shaped end portion, and an open span susceptible to resonance vibration; and means attached to said cylindrically shaped end portion for attenuating the resonance vibration of said open span of said leaf spring.

2. The suspension system according to claim 1, further comprising a leaf spring clamp mechanically engaging the outer cross-section of said leaf spring for in bundled together relation.

3. The suspension system according to claim 1, wherein said leaf spring is attached to said sprung portion of said automotive vehicle at a first position on said leaf spring and to said unsprung portion of said automotive vehicle at a second position on said leaf spring, and said means for attenuating said resonance vibration mechanically communicating with said leaf spring at a third position on said leaf spring, said third position being between said first and second positions.

4. The suspension system according to claim 1, wherein said means for attenuating said resonance vibration is operable to attenuate resonance vibration of said leaf spring during substantially all movement of the open span of said leaf spring.

5. The suspension system according to claim 1, wherein said leaf spring for insulating the transmission of road vibration being susceptible to sympathetic vibration, and said means for attenuating said resonance vibration being further operable to attenuate said sympathetic vibration.

6. The suspension system according to claim 1, wherein said means for attending said resonance vibration includes a hydraulic damper disposed between said leaf spring and said sprung portion of said automotive vehicle.

7. A suspension system for an automotive vehicle comprising: a sprung portion including a frame;

an unsprung portion including a road wheel;

a leaf spring disposed between said sprung portion and said unsprung portion, said leaf spring having forward and rearward end portions pivotably connected to said frame, a plurality of leaves, at least one of which includes a cylindrically shaped end portion, and a center portion supported over the road wheel with an open span between the forward end portion and the center portion that is susceptible to resonance vibration;

a first damper having opposite end portions pivotably connected, respectively, to said sprung and unsprung portions, said first damper being operable to damp movement between the sprung and unsprung portions of said suspension system; and a second damper having opposite first and second end portions pivotably connected, respectively, to the cylindrically shaped end portion and said sprung portion of said suspension system, said second damper being operable to absorb said resonance vibration of said open span.

8. The suspension system according to claim 7 further comprising a leaf spring clamp disposed in clamping engagement with and around the outer periphery of the leaf spring, the clamp being operative to provide alignment of the leafs of said leaf spring.

9. The suspension system according to claim 8, wherein said second damper is operable to generate softer damping forces during compression of said second damper than during extension of said second damper.

10. The suspension system according to claim 9, wherein said first end portion of said second damper is pivotably attached to the center of said open span.

11. The suspension system according to claim 10, wherein said second damper is operable to attenuate resonance vibration of said open span during substantially all vertical movement thereof.

12. A method for insulating road vibration in an automotive vehicle having a sprung and an unsprung portion, said method comprising the steps of:

securing a leaf spring to the sprung and unsprung portions of said automotive vehicle such that a central portion of the leaf spring is supported above said unsprung portion, said leaf spring including a plurality of leaves, at least one of which includes a cylindrically shaped end portion, and an open span susceptible to resonance vibration;

pivotably mounting the opposite end portions of a first damper to said leaf spring and said sprung portion such that one of said end portions is pivotably connected to said central portion and the other of said end portions is pivotably connected to said sprung portion;

pivotably mounting the opposite respective end portions of a resonance vibration damper to the cylindrically shaped end portion of said leaf spring and to said sprung portion of said automotive vehicle; and attenuating the resonance vibration of said leaf spring by allowing said resonance vibration damper to absorb said resonance vibration.

13. The method according to claim 12, wherein said step of attenuating the resonance vibration of said leaf spring includes the step of dissipating said resonance vibration by extension and compression of said resonance vibration damper.

14. The method according to claim 13 wherein said step of dissipating said resonance vibration includes the step of generating relatively soft damping forces by said resonance vibration damper during compression of said resonance vibration damper and generating relatively firm damping forces during extension of said vibration resonance damper.

15. The method according to claim 12, wherein said step of attenuating the resonance vibration of said leaf spring includes the step of attenuating resonance vibration of said leaf spring during substantially all movement of said leaf spring.

* * * * *

UNITED STATES PATENT AND TRADEMARK OFFICE
CERTIFICATE OF CORRECTION

PATENT NO. : 5,433,470

DATED : July 18, 1995

INVENTOR(S) : William R. Long

It is certified that error appears in the above-indentified patent and that said Letters Patent is hereby corrected as shown below:

On Title page, Abstract, line 2, "portions." should be --portion.--

Col. 1, line 39, "leave" should be --leaf--

Col. 2, line 21, "prospective" should be --perspective--

Co. 6, line 14, before "leaf" insert --a--

Col. 6, line 34, claim 2, after "for" insert

--maintaining the leaves of said leaf spring--

Col. 7, line 29, claim 8, "leafs" should be --leaves--

Col. 8, line 30, claim 14, "Claim 13" should be --Claim 13,--

Signed and Sealed this

Twenty-sixth Day of March, 1996

Attest:

BRUCE LEHMAN

Attesting Officer     Commissioner of Patents and Trademarks